United States Patent Office 2,856,153
Patented Oct. 14, 1958

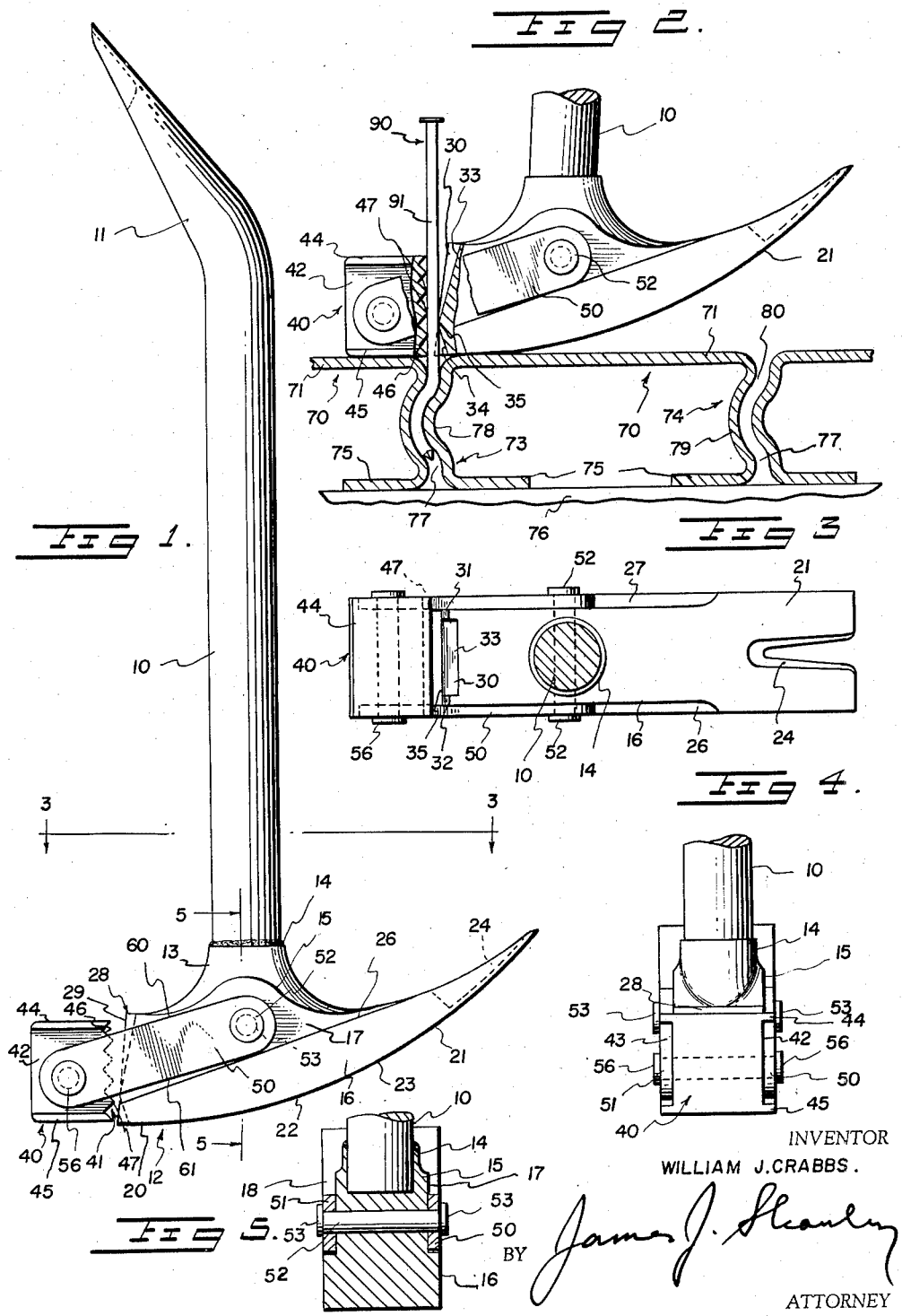

2,856,153

NAIL EXTRACTING DEVICE

William J. Crabbs, Dearborn, Mich., assignor to National Steel Corporation, a corporation of Delaware Application March 9, 1954, Serial No. 415,016

2 Claims. (Cl. 254—22)

This invention relates to extracting devices and more particularly to a device for removing nails and the like which have been securely driven into nail receiving means.

Frequently, it is necessary to remove nails securely driven into nail receiving means. When conventional extracting devices of the claw type are used for this purpose, the extraction force is applied to the nail through the nail head, and in practically every case when a substantial extracting force is required, the nail head will fail in shear and pull from the shank of the nail before the nail is completely removed from the nail receiving means.

Heretofore the difficulty of extracting nails from nail receiving means presented serious problems in connection with the use of nailable steel flooring, such as the type disclosed in Patent No. 2,667,243 of Harry D. Fenske. The nailable steel flooring disclosed in the Fenske patent comprises a plurality of channel members positioned side by side with adjacent members spaced apart to provide a nail entry slot. The channel members include side webs extending from the nail entry slot with adjacent side webs defining a nail receiving groove. The adjacent side webs include complementary curved portions defining a tortuous path for a nail driven into the nail receiving groove. In order to drive a nail into the nail receiving groove the nail must be driven with sufficient force to bend the shank of the nail continuously as it passes into the tortuous nail receiving groove.

Nailable steel flooring of the foregoing character possesses extremely good nail holding qualities, inasmuch as the nail must be bent throughout the same tortuous path in order to be extracted from the nail receiving groove. Thus, substantially greater forces are required for extracting nails from the nail receiving groove of this type of nailable steel flooring. Because of the greater forces required, in practically every case when such extraction is attempted by employing a conventional claw device, the nail head will fail in shear and pull from the shank of the nail. The frequent failure of the nail head when attempting to extract nails from nailable steel flooring with conventional claw devices results from the fact that a relatively large extraction force is required, not only at the beginning of the extraction process to overcome the friction between the nail and the nail receiving groove and initially move the nail from the nail receiving groove, but also to complete the extraction. The high extraction force required to complete the extraction results from the fact that the shank of the nail must be bent throughout the tortuous nail receiving groove, and the high extraction force is required substantially throughout the extraction process, although the extraction force decreases as the portion of the nail contacting the nailing groove decreases.

It is therefore an object of the present invention to provide an extraction device which overcomes the disadvantages enumerated above.

Another object is to provide a nail extracting device operable to extract nails and the like from nail receiving means without requiring the application of an extracting force to the head of the nail.

Still another object of the present invention is to provide a nail extracting device adapted to operate upon the nail by gripping the shank of the nail and applying an extracting force to the nail without applying a force to the nail head.

A still further object of the present invention is to provide a nail extracting device particularly designed for use in extracting nails which have been securely driven into nail receiving slots of nailable steel flooring which is adapted to operate upon the shank of the nail to apply an extracting force of relatively large magnitude to the nail without utilizing the nail head.

A still further object is to provide a nail extracting device of the foregoing character of comparatively simple design and of rugged construction which may be manufactured at relatively low cost and provide long periods of continuous service without failure.

Other objects and features of the invention will appear more fully from the following detailed description considered in connection with the accompanying drawing which illustrates the preferred embodiment of the invention. It is to be expressly understood, however, that the drawing is designed for purposes of illustration only and not as a definition of the limits of the invention, reference for the latter purpose being had to the appended claims.

In the drawing, in which similar reference characters denote similar elements throughout the several views:

Fig. 1 is a view in side elevation of an extracting device constructed in accordance with the principles of the present invention;

Fig. 2 is a detailed view, partially in section, of the extracting device of Fig. 1, illustrated to show the relationship of its component parts when in operation to extract a nail from nailable steel flooring;

Fig. 3 is a view in section taken along the line 3—3 of Fig. 1;

Fig. 4 is a view in front elevation of the extracting device shown in Fig. 1; and Fig. 5 is a view in section taken along the line 5—5 of Fig. 1.

With reference more particularly to the drawing, an extraction device constructed in accordance with the principles of the present invention is disclosed therein including a handle member 10 having a hand engaging end 11 and a nail engaging device 12 secured to the other end of the handle member. The nail engaging device 12 includes a body member 13 having a top portion 14, a central portion 15 and a base portion 16. The top portion 14 at its upper end presents a cross section substantially corresponding to the cross section of the handle member at its lower end, as viewed in the drawing, and is secured to the lower end of the handle member in any suitable manner such as by welding, as shown. The top portion is of gradually increasing cross section as it approaches and finally merges into the central portion 15. The sides of the central portion 15 extend outwardly beyond the corresponding sides of the top portion and present external side surfaces 17 and 18 on the opposite sides of the central portion. The external side surfaces 17 and 18 are parallel to each other and to the central longitudinal axis of the handle member 10, and are disposed equally on opposite sides of the latter axis. At its lower edge the central portion merges into the base portion 16. The base portion 16 has a width greater than the spacing between the external side surfaces 17 and 18 and is symmetrically positioned with respect to the longitudinal axis of the handle member 10 so that equal portions of the base member extend outwardly beyond the external side surfaces 17 and 18. The base portion 16 is elongated with respect to the top and central portions, and is provided with a head end 20 on one side of the longitudinal axis of the handle member and a toe end on the other side of the longitudinal axis. The head end 20 terminates in the region of one of the terminating ends of the central portion, while the toe end 21 extends rearwardly a substantial distance beyond the other terminating end of the central portion. The base portion includes an end or bottom face 22 perpendicular to the external side surfaces 17 and 18. The end surface 22 has a width dimension corresponding to the width of the base portion and includes an arcuate portion 23 which extends from the head end to the toe end in a direction upwardly toward the hand engaging end of the handle member. The arcuate portion 23 may be of gradually decreasing radius as the portion extends from the head end to the toe end, with the end of the arcuate portion adjacent the head end approaching a flat surface. The toe end 21 may be provided with a slot 24 to form a claw if desired. For a purpose that will appear more fully below, the sides of the base portion extend outwardly beyond the external side surfaces 17 and 18 to define side shoulders 26 and 27, respectively. The side shoulders are perpendicular to the external side surfaces and extend linearly beyond the end of the central portion.

The head end of the base portion and the terminating end of the central portion located on the left side of the longitudinal axis of the handle member, as viewed in the drawing, are merged together and form the head portion 28 of the body member. The head portion includes a terminating end 29 comprising a central recess portion 30 formed by outwardly projecting edge portions 31 and 32. The face of the recessed portion includes an upper inclined surface 33 extending downwardly and outwardly from the upper side of the head portion, and a lower inclined surface 34 extending upwardly and outwardly from the lower side of the head portion. The inclined surfaces 33 and 34 merge together along a line 35 which extends across the recess portion 30 and comprises a nail contacting area of the body member.

The body member may be made of malleable cast iron or suitable steel alloys, forged or otherwise shaped to include the top, central, and base portions substantially of the character described above.

The nail engaging device also includes a movable or floating jaw member 40. The jaw member 40 comprises a metal block, which may be formed from the same metal comprising the body member, of generally rectangular shape, presenting a nail engaging surface 41 having substantially the same projected cross sectional area as the recess portion 30 of the body member. Also, the jaw member 40 includes spaced parallel side surfaces 42 and 43 spaced from each other a distance corresponding to the spacing between the side surfaces 17 and 18 of the body member, and upper and lower flanges 44 and 45 extending outwardly from each of the side surfaces 42 and 43. The flanges 44 and 45 may extend outwardly in a direction substantially perpendicular to the side surfaces a distance corresponding to the extension of the shoulders 26 and 27 outwardly beyond the side surfaces 17 and 18 of the body member. The nail engaging surface 41 of the jaw member 40 is provided with a plurality of parallel grooves or serrations 46 extending throughout the width of the surface in a direction parallel to the bottom supporting surface of the jaw member. As will appear more fully below, this construction provides a plurality of spaced ridges 47 extending throughout the height of the nail engaging surface 41 which are adapted to be positioned transversely of the longitudinal axis of a nail to be engaged thereby.

The jaw member 40 is mounted on the body member for limited floating movement relative to the body member. For this purpose flat link members 50 and 51 are each pivotally secured to the body portion and to the jaw member. The link members are positioned parallel to the side surfaces of the body member and the jaw member, with the link member 50 positioned against the side surfaces 17 and 42 and with the link member 51 positioned against the side surfaces 18 and 43. One end of each of the link members is pivotally secured to the body member for swinging movement about an axis perpendicular to the side surfaces; the axis may lie on the longitudinal axis of the handle member. A pivot member 52 may be provided for securing one end of the link members onto the body member. The pivot member 52 may comprise a single cylindrical element passing through the body member and the link members and being provided with heads 53 for retaining the link members onto the body member. The other ends of the link members 50 and 51 are pivotally secured to the jaw member 40 for mounting the jaw member for swinging movement relative to the link members about an axis parallel to the axis of the pivot member 52. A pivot member 56, which may be similar to the pivot member 52, is provided for this purpose as well as for securing the link members to the jaw member. With this arrangement, the jaw member 40 may be pivoted relative to the body member about the pivot member 56, and also, together with the link members 50 and 51, about the pivot member 53.

The link members 50 and 51 are preferably provided with parallel upper and lower longitudinal edges 60 and 61 which may be equally distant from the axes of the pivot members 53 and 56. The perpendicular distance between the axis of the pivot member 53 and the lower longitudinal edge 61 is at least slightly less than the perpendicular distance between the axis of the pivot member 53 and the straight shoulder portions 26 and 27. With this construction, when the device is positioned with the handle portion vertically disposed and with the hand engaging end upward, the lower longitudinal edge of the link members 50 and 51 will lie against the shoulders 26 and 27 and limit downward rotation of the link members about the pivot member 53. The flanges extending outwardly from the side surfaces 42 and 43 of the jaw member 40 contact the upper and lower edges of the link members and limit rotation of the jaw member about the pivot member 56. This arrangement maintains the nail engaging surfaces of the jaw member and the body member in substantial face to face relation so that the extraction device may be more easily employed as will appear more fully below.

The length of the link members 50 and 51, as well as the location of pivot members 53 and 56 with respect to the nail engaging surfaces of the body member and the jaw member, determines the spacing between the surface 41 of the jaw member and the nail contacting area 35 of the body member. This spacing is established so that the device may be easily positioned over a nail, with the nail located between the surface 41 and the nail contacting area 35, when the device is in its initial position, that is, when the handle member is substantially vertically disposed and extending upwardly with the lower surface of the jaw member and the end face 22 at the head end of the body member lying on a substantially common plane.

In Fig. 2 of the drawings, an extracting device embodying the principles of the present invention is shown operating upon a nail securely driven in the nailing groove of nailable steel flooring, to extract the nail from the nailable steel flooring. The nailable steel flooring may follow the teachings of the Fenske patent and include a plurality of channel members 70 having coplanar deck members 71 and web portions 73 and 74 extending downwardly from opposite edges of each of the deck members, each web portion terminating in a foot flange 75 bearing on a supporting structure 76 extending longitudinally of the channel members 70. The channel members are arranged with the web members of adjacent channel members in spaced relation to provide a nail receiving slot or groove 77 therebetween, and the spaced web portions are provided with complementary male and female corrugations 78 and 79, to form a tortuous path in the nail receiving groove. The space between the deck portion of adjacent channel members provides an entry throat 80 for the nail receiving slot. In order to drive a nail into the nail receiving groove, the nail must be driven with sufficient force to bend the nail throughout the tortuous path in the nail receiving groove, and the nail cannot be removed from the groove without applying a sufficient extraction force to again bend the nail throughout the tortuous path. Generally, a greater extraction force is required than a driving force in view of the effect the initial bending of the nail has upon its metallurgical characteristics.

Nailable steel flooring has wide utility as flooring in railroad cars, trucks and the like in which lading is securely mounted on the conveyance floor by means of loading blocks secured to the flooring by nails driven through the blocks into the nail receiving grooves of the flooring. When the freight arrives at its destination, the loading blocks, being expendable items, are split or otherwise broken away from the nails and quickly removed so that the lading may be unloaded as quickly as possible. This procedure leaves the loading block retaining nails in the nail receiving grooves with a substantial length of the nail extending upwardly beyond the surface of the nailable steel flooring. As discussed above, numerous difficulties are encountered when attempting to remove these nails by means of conventional nail extracting devices of the claw type for the reason that the claw devices operate upon the heads of the nail and the nail heads are incapable of withstanding the forces required to extract the nail from the nail retaining groove. A nail extracting device provided by the present invention overcomes these difficulties by operating upon the shank of the nail as will be described below.

When a nail extracting device of the type provided by the present invention is employed to extract nails from nailable steel flooring for example, the extracting device is held in an upright position with the hand engaging end above the nail engaging device and with the handle member substantially vertically disposed. The link members 50 and 51 are then pivoted upwardly about the pivot member 53 and the jaw member 40 is pivoted about the pivot 56, to move the nail engaging surface 41 outwardly and away from the nail contacting area 35 to provide sufficient spacing therebetween and allow the nail engaging device to pass downwardly of a nail 90 and occupy a position with the lower side of the movable jaw 40 and the flat face at the head end of the body member resting on the surface of the flooring adjacent the nail. In this position of the nail engaging device the shank 91 of the nail 90 is located between the surface 41 and the nail contacting area 35 as shown in Fig. 2. The nail extracting process may then be initiated by moving the handle member 10 downwardly in a plane substantially perpendicular to the axis of the pivot member 53 and also substantially perpendicular to the surface of the flooring. Upon this movement of the handle member 10, the body member moves to the left, as viewed in the drawing, until the nail contacting edge 35 moves into engagement with the shank of the nail, and then the body member 12 rotates in a clockwise direction about a pivot line located along the bottom face 22, the pivot line moving along the bottom face 22 in a direction away from the nail as the handle 10 is moved further downwardly. Upon initial downward movement of the handle member 10, the link members 50 and 51, being pivoted to the body member, rotate therewith to move the serrated surface of the jaw member 40 into contact with the shank of the nail. Since the jaw member 40 is pivoted for swinging movement relative to the link members each ridge 47 of the serrated surface 46 will contact the shank of the nail. After the jaw member and the body member are moved into gripping contact with the shank of the nail, upon further downward movement of the handle member 10 the jaw member and the body member will rotate in a clockwise direction as a unitary member carrying the nail therewith. Since the nail is securely gripped between the faces of the body member and the jaw member, the nail will move upwardly with the upward movement of the head end of the body member and will be extracted from the nail receiving groove. As the handle 10 continues to move downwardly in a clockwise direction, the pivot line on the face 22 will move outwardly towards the toe end of the base portion 16 and eventually the mechanical advantage will fall off and it will be desirable to reset the device at a lower point on the shank of the nail. This is accomplished by moving the handle member 10 in a counterclockwise direction to a substantially vertical position and then placing the face 22 adjacent the head end and the bottom surface of the jaw 40 on the surface of the flooring adjacent the nail in a manner previously described and by again rotating the handle member downwardly in a clockwise direction. This step by step extracting process may be repeated with relative ease until the nail is fully extracted from the nail receiving groove.

The claw means at the handle engaging end of the handle member 10 and the claw means at the toe end of the base portion 16 may be employed for removing the blocking from around the nail or for initially moving the nail upwardly from a surface to expose a shank of sufficient length to allow engagement by the nail engaging means as described above.

The present invention thus provides a nail extracting device which operates upon the shank of the nail without utilizing the nail head of the nail and is capable of applying extremely high extraction forces to a nail sufficient to extract nails from nail receiving means, such as nail receiving grooves of nailable steel flooring, without shearing the head from the nail and without otherwise rupturing the nail. The nail extracting device is of relatively simple design including a minimum number of moving parts but which is of rugged construction capable of repeatedly carrying heavy nail extracting forces and which is capable of being easily operated for extracting secured nails within a minimum period of time.

While the nail extracting device provided by the present invention has been described in connection with the extraction of nails from nailable steel flooring, it is to be expressly understood that the device may be utilized for extracting nails and the like from any form of nail retaining means.

Although only one embodiment of the invention is disclosed and described herein it is expressly understood that various changes and substitutions may be made therein without departing from the spirit of the invention as well understood by those skilled in the art. Reference therefore will be had to the appended claims for a definition of the limit of the invention.

What is claimed is:

1. A nail extracting device comprising an elongated handle member, one end of the handle member comprising a hand engaging end, an elongated body member connected to the other end of the handle member, the body member including a head end and a toe and an elongated end face of substantial width extending from the head end to the toe end, the end face including an arcuate portion extending in a direction to the toe end upwardly toward the hand engaging end of the handle member, the head end of the body member terminating in a nail engaging surface lying in a plane substantially perpendicular to the longitudinal axis of the body member, a movable jaw member having a nail engaging surface, the nail engaging surface of the movable jaw member including a plurality of coplanar nail engaging teeth, link means pivotally connected to the movable jaw member and the body member for pivotally mounting the jaw member for limited movement relative to the link means with the coplanar nail engaging teeth of the nail engaging surface of the movable jaw member facing the nail engaging surface of the head end of the body member, the nail engaging surface of the head end of the body member including a pair of tapered surfaces inclined outwardly toward a common point of the nail engaging surface adjacent the end face and forming an outwardly projecting nail contacting area, means for limiting the pivotal movement of the link means relative to the body member in a direction away from the handle member the nail engaging surface of the head end of the body member and the nail engaging surface of the movable jaw member being in spaced relation with the end face at the head end of the body member and the movable jaw member lying on a substantially coplanar surface, whereby the body member and the jaw member may be positioned with a nail to be extracted between the nail engaging surfaces and the surfaces may be moved into engagement with the nail upon rotation of the handle member downwardly about a pivot point on the end face displaced from the head end of the body member.

2. A nail extracting device comprising an elongated handle member, one end of the handle member comprising a hand engaging end, an elongated body member connected to the other end of the handle member, the body member including a head end positioned on one side of the longitudinal axis of the handle member and a toe end positioned on the other side of the longitudinal axis of the handle member and an elongated end face of substantial width extending from the head end to the toe end, the end face including an arcuate portion extending in a direction to the toe end upwardly toward the hand engaging end of the handle member, the head end of the body member terminating in a nail engaging surface lying in a plane substantially perpendicular to the longitudinal axis of the body member, the nail engaging surface of the head end of the body member including a pair of tapered surfaces inclined outwardly toward each other and merging into an outwardly projecting nail contacting area adjacent the end face, a movable jaw member including a nail engaging surface, the nail engaging surface of the movable jaw member including a plurality of coplanar nail engaging teeth, the body member including spaced parallel longitudinally extending side surfaces with each side surface being substantially perpendicular to the end face of the body member, the jaw member including a pair of spaced parallel side surfaces, the spacing between the parallel side surfaces of the jaw member substantially corresponding to tthe spacing between the side surfaces of the body member, a link member positioned on each side surface of the body member and the jaw member, means pivotally connecting one end of the link members to the body member and means pivotally connecting the other end of the link members to the jaw member to pivotally mount the jaw member for movement relative to the body member, means for limiting pivotal movement of the jaw member relative to the link members to position the nail engaging surface of the jaw member in substantial face to face relation with the nail engaging surface of the head end of the body member, means for limiting relative pivotal movement of the link means relative to the body member in a direction away from the handle member so that the nail engaging surface of the head end of the body portion and the nail engaging surface of the movable jaw member are maintained in spaced relation with the end face at the head end of the body member and the movable jaw member lying on a substantially coplanar surface, whereby the body member and the jaw member may be positioned with a nail to be extracted between the nail engaging surfaces and whereby the surfaces may be moved into engagement with the nail upon rotation of the handle member downwardly about a pivot point on the end face displaced from the head end of the body member.

References Cited in the file of this patent

UNITED STATES PATENTS

| Number | Name | Date |
|---|---|---|
| 855,564 | Gatti | June 4, 1907 |
| 1,028,291 | Shaffer | June 4, 1912 |
| 1,103,767 | Hendrickson | July 14, 1914 |
| 1,502,391 | McPherson | July 22, 1924 |
| 1,519,069 | Snyder | Dec. 9, 1924 |

FOREIGN PATENTS

| Number | Country | Date |
|---|---|---|
| 14,622 | Sweden | Aug. 30, 1902 |